Nov. 17, 1925.	1,561,645
M. HOWARD
SPRAYER
Filed June 2, 1924	3 Sheets-Sheet 1
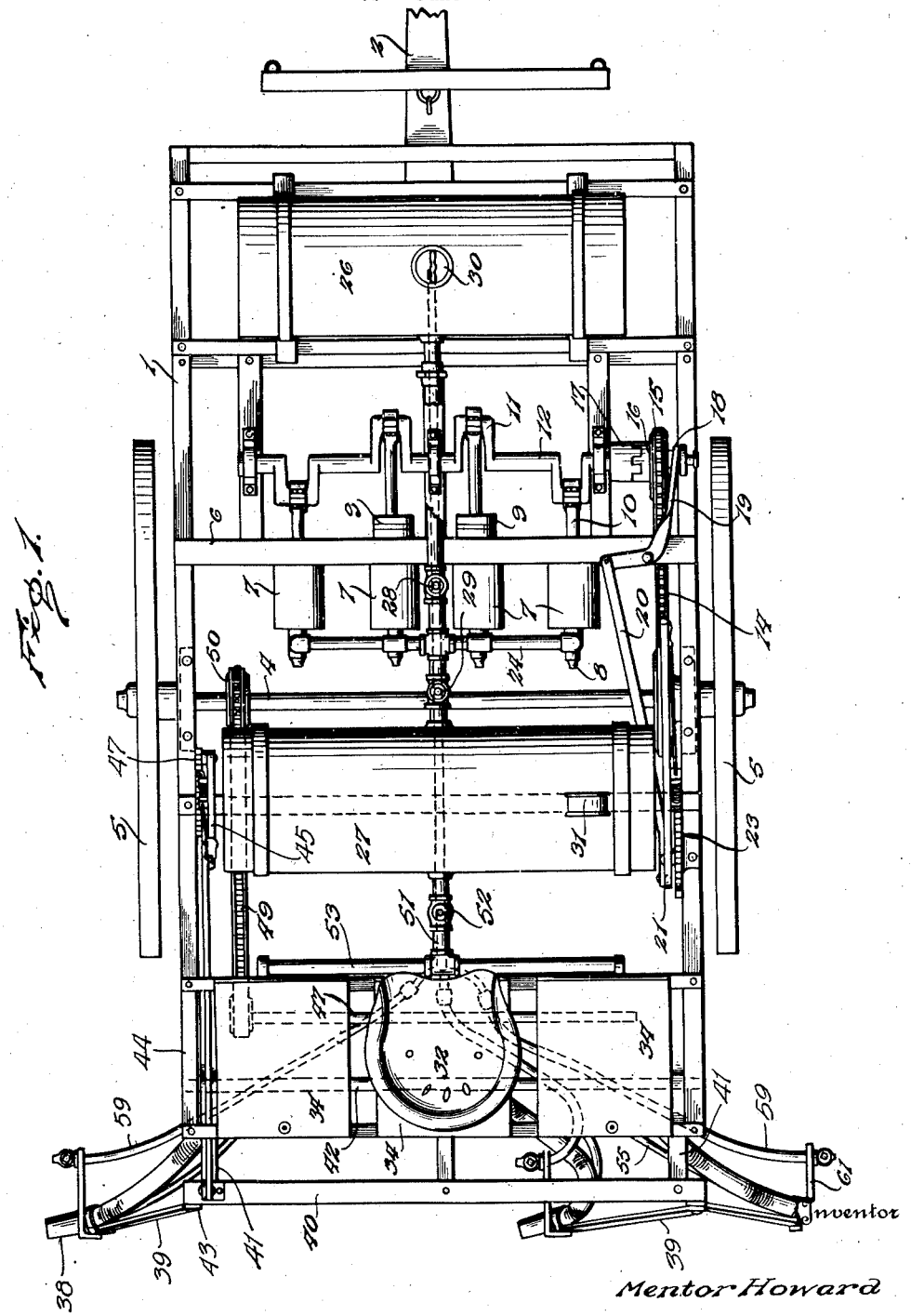

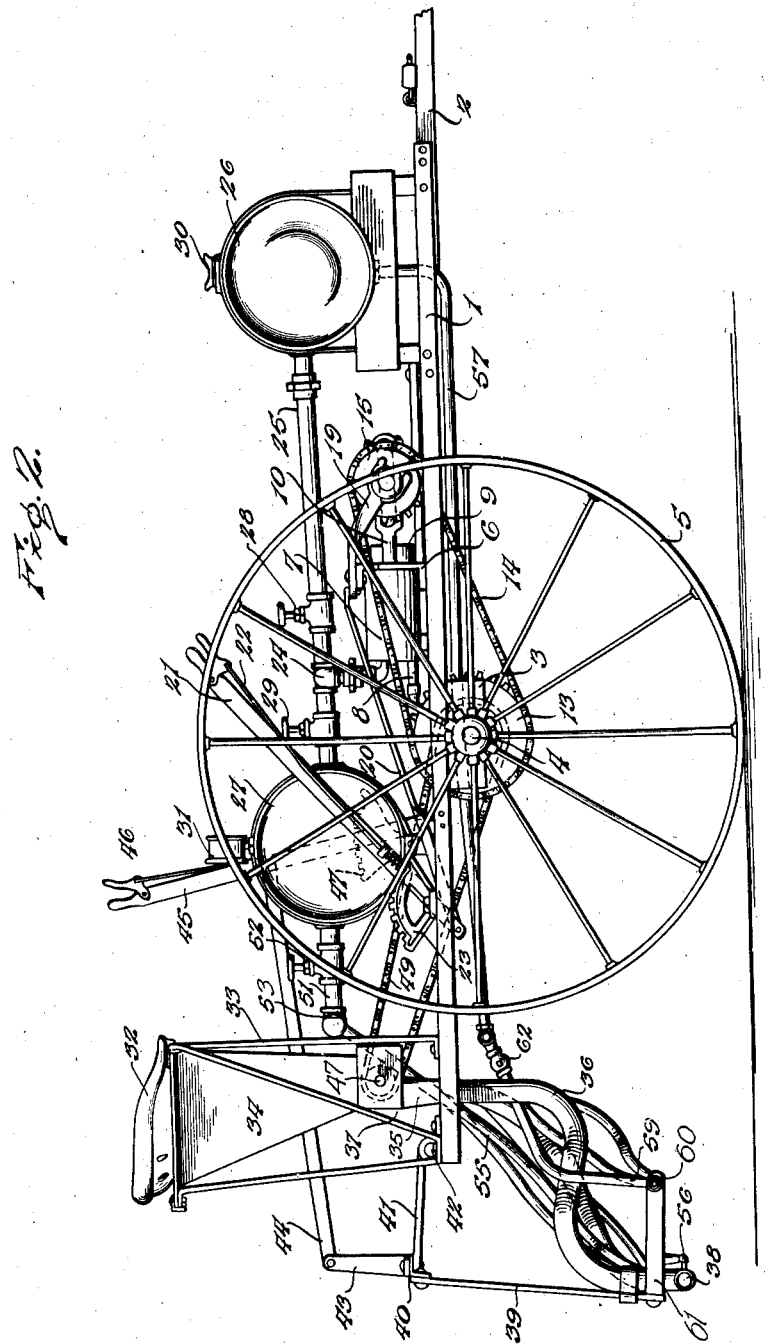

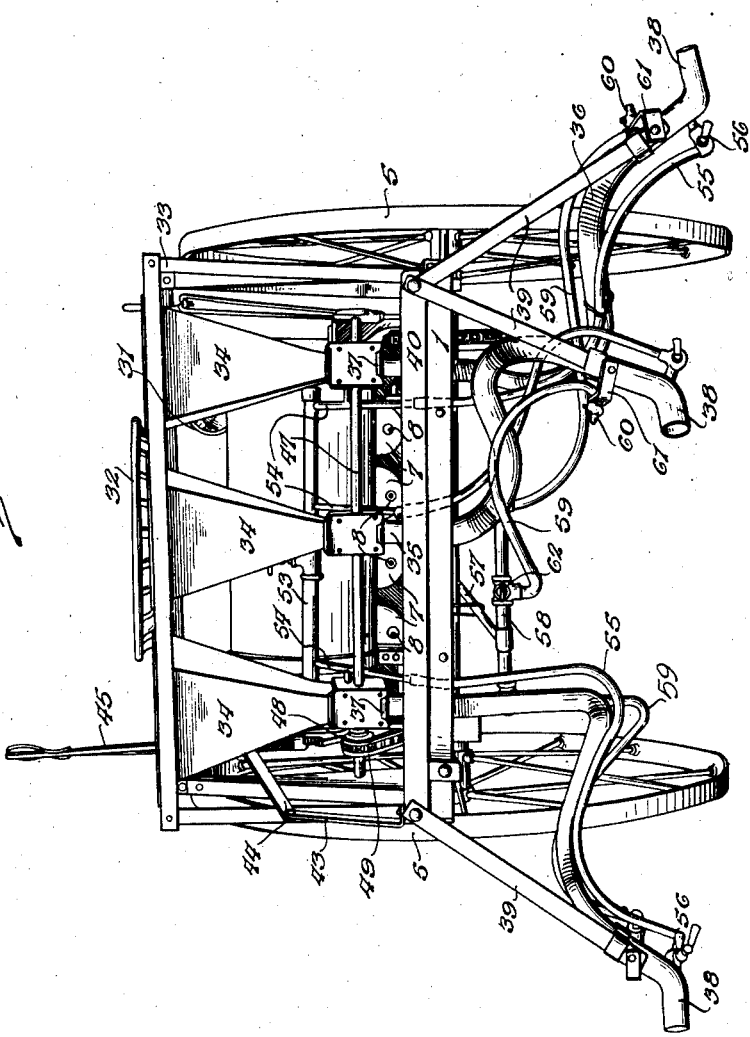

Patented Nov. 17, 1925.

1,561,645

UNITED STATES PATENT OFFICE.

MENTOR HOWARD, OF WEATHERFORD, TEXAS.

SPRAYER.

Application filed June 2, 1924. Serial No. 717,408.

*To all whom it may concern:*

Be it known that I, MENTOR HOWARD, a citizen of the United States, residing at Weatherford, in the county of Parker and State of Texas, have invented certain new and useful Improvements in Sprayers, of which the following is a specification.

This invention relates to apparatus for applying poison to plants for the purpose of destroying insects which may be feeding thereon and is intended more particularly for use in spraying cotton plants to rid them of boll weevils, although it is adapted for use in spraying or treating other crops. One object of the invention is to provide a simple and compact portable machine by the use of which a poisonous powder may be spread upon the plants in the form of a thin spray and a liquid may be also sprayed thereon in a dew-like form and the powder, the liquid or both may be directed upwardly or in any desired direction. The invention also has for its object the provision of means whereby the spraying elements may be raised or lowered and held at any desired elevation, and a still further object of the invention is to provide an apparatus in which the powder may be drawn from the receptacle containing it through the force of an air blast created by pumps or compressors driven by the supporting wheels of the apparatus, the air pressure being also utilized to deliver the liquid in the form of a spray. These stated objects, and other objects which will appear incidentally in the course of the following description, are attained in the use of such a mechanism as is illustrated in the accompanying drawings, and the invention resides in certain novel features which will be particularly pointed out in the appended claims.

In the drawings:

Figure 1 is a plan view of an apparatus embodying my invention;

Fig. 2 is a side elevation of the same, and

Fig. 3 is a rear perspective view of the same.

In carrying out my invention, I employ a frame 1 of any approved construction to the front end of which is secured a draft pole or tongue 2 and which is provided between its ends with suitable bearings 3 in which an axle 4 is journaled, the axle carrying ground wheels 5 at its ends. Mounted upon the main frame and held thereon by a supplemental transverse frame 6 are a series of pumps or air compressors 7 which may be of any approved construction and are equipped with air intake ports or pipes 8. The pumps are preferably of the reciprocating piston type and the pistons 9 have piston rods 10 extending therefrom beyond the front ends of the respective pumps, the respective piston rods being coupled to the cranks 11 of a shaft 12 which is journaled in suitable bearings upon the frame and is adapted to be driven from the ground wheels 5. In order that the motion of the ground wheels may be transmitted to the crank shaft 12, a sprocket 13 is secured upon the axle 4 adjacent one side of the frame, and a sprocket chain 14 is trained around the said sprocket and a sprocket pinion 15 which is loosely mounted upon the crank shaft and provided with a clutch hub 16, as shown most clearly in Fig. 1. A clutch sleeve 17 is secured upon the crank shaft and is adapted to be engaged by the clutch hub 16 when the same is shifted longitudinally of the crank shaft, as will be understood. To effect the shifting of the clutch hub and the sprocket 15, the hub of the sprocket is provided in its outer end with an annular groove 18 which is engaged by the front forked end of an angle lever 19 which is fulcrumed at its bend upon the supplemental frame 6 and has its rear inwardly extending arm connected by a link 20 with the lower end of a hand lever 21 fulcrumed upon the main frame and equipped with a latch 22 cooperating with a segment or holding rack 23 in the usual manner. When the pumps are to operate, the hand lever is rocked so that the angle lever 19 will be swung about its fulcrum and the clutch hub 16 thrown into engagement with the clutch sleeve 17, whereupon the crank shaft 12 will be set in motion and the pistons of the several pumps operated. After the desired pressure has been established, the lever 21 is rocked so as to disengage the clutch members and the operation of the pumps will then cease. The outlets of the pump are connected by a discharge pipe 24 to a conduit or feed pipe 25 which extends longitudinally of the machine to a front water tank 26 and a rear air tank 27 which are secured rigidly upon the frame by any convenient or preferred means. A cut-off valve 28 is provided in the pipe 25 between the discharge pipe 24 and the water tank 26, and a similar valve 29 is provided between the pipe 24 and the air tank 27 so that the pressure established in the tanks may be maintained even while the pumps are not operating. The water tank is provided with a suitable filling spout or plug 30 and a pressure gage 31 is mounted upon the air tank where it may be easily read by the operator upon the seat 32 which is carried by a frame 33 erected upon the rear end of the main frame 1. Inasmuch as the pressure will generally be equal in the two tanks, it is not necessary to provide a pressure gage upon the water tank which is located at the front end or near the front end of the machine.

Supported by the rear end of the main frame and by the vertical frame 33 are hoppers 34 which contain powder and have their side walls converging downwardly so that the powder will be directed into outlet nozzles 35. from each of which a hose or flexible discharge pipe 36 extends. A slide valve 37 of any convenient form is mounted in the lower end of each hopper immediately over the spout 35 so that the quantity of powder permitted to be discharged may be easily regulated, and at the free end of each hose or flexible pipe is a discharge spout or nozzle 38 which is rotatably fitted upon the end of the hose and may be thereby turned to discharge the powder in any desired direction. The free ends of the hose or flexible pipes are carried by hangers 39 depending from a cross bar 40 which, in turn, is carried by arms 41 rotatably mounted upon a cross bar 42 secured upon the rear end of the main frame. Rising from the cross bar 40, preferably adjacent one end thereof, is a crank or lever arm 43 to the upper end of which is pivoted the rear end of a link or connecting rod 44 which extends forwardly and is pivoted to a hand lever 45 mounted upon the main frame and equipped with a latch 46 cooperating with a holding rack 47 in the usual manner. It will be readily noted that, by shifting the hand lever 45, the discharge nozzles may be raised or lowered and set to operate at any desired height above the ground, being thus adjusted to the heights of the plants and also being capable of such adjustment as will permit them to clear plants when the machine is to be moved from one field to another field. An agitating shaft 47 is journaled in the walls of the hoppers 34 and extends through the lower ends thereof, being equipped within the hoppers with agitators or stirrers of any preferred form. Upon one end of this agitating shaft is secured a sprocket pinion 48, and a sprocket chain 49 is trained around the said pinion and a sprocket 50 on the axle 4 so that the agitating shaft will be driven from the axle and caking of the powder will be prevented.

An outlet pipe 51 extends rearwardly from the air tank 27 and is equipped with a cut-off valve 52 so that the flow therefrom may be regulated or shut off entirely as the driver may prefer. The said outlet pipe 51 communicates directly with a cross pipe 53 from which extend branches 54 corresponding in number to the hose or flexible pipes 36 and each being coupled to a flexible pipe 55 which is disposed alongside one of the flexible pipes 36 and has its lower end coupled into the discharge spout 38 so that the compressed air admitted into the branch 54 and flowing through the pipe 55 will be discharged through the said nozzle and create a suction therethrough which will draw from the hopper a portion of the powder and distribute the same in a spreading spray. Each flexible pipe 55 is provided with a regulating valve 56 immediately adjacent the respective spout 38 so that the force of the suction may be easily regulated.

A discharge pipe 57 extends from the bottom of the water tank 26 longitudinally rearward of the main frame, and the rear end of this pipe 57 is coupled into a cross pipe 58 from which a plurality of flexible pipes 59 extend, the free ends of these pipes being fitted with nozzles 60 carried by brackets 61 which are secured about the discharge pipes 38 whereby the adjustment of the said nozzles 38 will effect a similar adjustment of the nozzles 60. Cut-off valves 62 are provided in the pipes 59 so that the flow therethrough may be controlled in an obvious manner.

It is thought the operation of my improved apparatus will be readily understood from the foregoing description, taken in connection with the accompanying drawings. The tank 26 is filled or partly filled with water containing a soluble poison or insecticide, and the hoppers 34 are filled with some insecticide in powdered form. The nozzle-supporting frame is set so that the nozzles will be adjusted to the height of the plants to be sprayed and the machine is then driven over the field along the rows of plants, and it will be readily noted that the particular embodiment of the invention illustrated in the drawings is equipped with three series of discharge pipes and nozzles so that three rows of plants may be sprayed at one time. As the machine is drawn forward, the pumps will be operated to establish pressure in the air tank and the water tank, and after the desired pressure has been established the pumps may be thrown out of operation and the valves 28 and 29 closed. If the valve 52 be held closed and the valves 62 opened, a discharge from the water tank will be effected through the nozzles 60, and this discharge may be directed upwardly against the under sides of the leaves of the plants so that it will reach insects and other pests which are not reached by the usual methods of spraying. The liquid will escape in the form of a fine spray and under such pressure that it will be carried upwardly to some appreciable distance above the tops of the plants and will settle over them in the manner of dew and, consequently, the entire foliage will be treated. If it be desired to also spray the plants with the powdered poison, the valve 52 is opened and the valves 56 also opened either entirely or partly as may be best adapted to each particular case. The valves 37 being properly adjusted, the compressed air escaping from the tank 27 will pass out through the pipes 51, 54 and 55, as previously described, and will suck from the hoppers charges of powder which will be driven through the nozzles 38 so as to settle upon the plants and cover their foliage. Of course, the powder may be sprayed upon the plants without at the same time spraying the liquid but in most instances the best results are attained by simultaneously discharging the liquid and the powder.

My improved machine is exceedingly compact and is composed of few parts so that it is not apt to get out of order and will operate efficiently through a long period of use.

Having thus described the invention, I claim:

1. A spraying machine comprising a wheeled supporting frame, an air tank mounted thereon, a liquid tank also mounted thereon, an air compressor mounted on the frame and driven from the wheels thereof, the discharge of the air compressor being in communication with both the air tank and the liquid tank, a powder container mounted on the frame, discharge pipes leading from the air tank, the liquid tank and the powder container respectively and having their ends in proximity to each other, nozzles mounted on the ends of all the discharge pipes, the nozzle on the pipe leading from the air tank being coupled into the nozzle on the pipe leading from the powder container, and a support for all the nozzles carried by the rear end of the supporting frame.

2. A spraying machine comprising a portable frame, an air tank mounted thereon, an air compressor connected with the air tank, a powder container mounted on the frame, discharge pipes leading from the tank and the container respectively and having their ends in proximity to each other, nozzles on the ends of the discharge pipes, the nozzle on the air discharge pipe being coupled into the nozzle on the powder discharge pipe, and pendent means on the rear end of the frame connected with all the nozzles for suspending the same and the ends of the pipes.

In testimony whereof I affix my signature.

MENTOR HOWARD. [L. S.]